«12» United States Patent
Shapira

(10) Patent No.: US 8,279,423 B2
(45) Date of Patent: Oct. 2, 2012

(54) COMPUTATION OF WIND VELOCITY

(75) Inventor: Joseph Shapira, Yavne (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 159 days.

(21) Appl. No.: 12/819,211

(22) Filed: Jun. 20, 2010

(65) Prior Publication Data

US 2010/0253932 A1     Oct. 7, 2010

Related U.S. Application Data

(63) Continuation-in-part of application No. 10/580,224, filed on May 22, 2006, now Pat. No. 7,739,823.

(51) Int. Cl.
    *G01P 3/36*     (2006.01)
(52) U.S. Cl. .......................................... 356/28; 356/28.5
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS 6,247,259 B1 *   6/2001   Tsadka et al. .................. 42/114

\* cited by examiner

*Primary Examiner* — Luke Ratcliffe
(74) *Attorney, Agent, or Firm* — Dekel Patent Ltd; David Klein

(57) ABSTRACT

A system for computation of wind velocity including a laser adapted to transmit a beam to a target, a collecting lens for receiving a beam returning from the target, and receiver optics comprising a multi-element detector array at a focal plane of the collecting lens, wherein for each element of the multi-element detector array there is a specific optical path in the atmosphere leading from the laser to the target and back from the target to the element; and processor apparatus operative to measure signal fluctuations of an element of the multi-element detector array, and compute therefrom crosswind velocity of wind in the atmosphere, wherein said processor apparatus is operative to calculate turbulence strength changes and wind profiles.

14 Claims, 1 Drawing Sheet

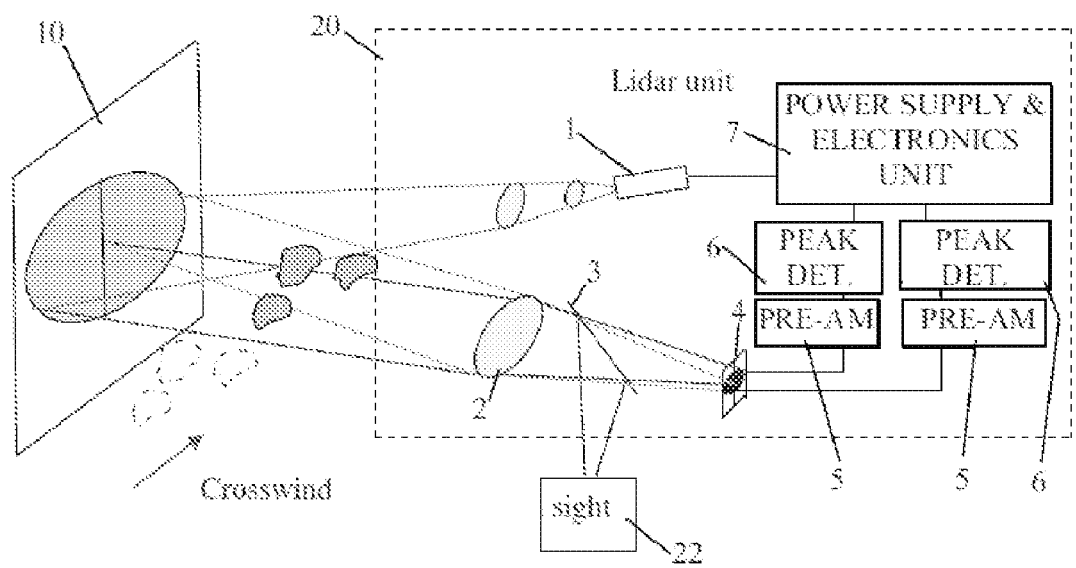

COMPUTATION OF WIND VELOCITY

CROSS-REFERENCE TO RELATED APPLICATIONS

This application is a continuation-in-part of, and claims priority from, U.S. patent application Ser. No. 10/580,224, filed May 22, 2006, now U.S. Pat. No. 7,739,823, which is incorporated herein by reference.

FIELD OF THE INVENTION

The present invention is related to methods for computation of wind velocity, particularly taking into account fluctuations in cross-wind velocity.

BACKGROUND OF THE INVENTION

U.S. Pat. No. 6,247,259 to Tsadka, et al., assigned to the present assignee, describes a method for the fire control of flat trajectory weapons, which comprises the steps of measuring the target range and cross wind velocity along the intended projectile trajectory prior to firing the weapon and, using the know ballistic equations of the projectile, determining the expected vertical and horizontal deflection of the projectile and adjusting the weapon sight to compensate for said deflections.

More specifically, the method of U.S. Pat. No. 6,247,259 comprises, prior to firing the weapon, the steps of generating a laser beam at the firing position, receiving the beam reflected by the desired target, determining the target range by measuring the time lag between the generation of said laser beam and the reception of said reflected beam (viz. the double pass time of flight of the laser pulse between transmitter and target), determining the crosswind direction and velocity along the trajectory by receiving said reflected laser beam in two separate positions and measuring the intensity fluctuations of said beam in said two separate positions, determining, using the ballistic equations of the projectile, the expected vertical and horizontal deflection of the projectile, and adjusting the weapon sight to compensate for said deflections, either by a) providing the shooter with sufficient information to adjust the sight of the weapon as required by said deflections, or b) automatically adjusting said sight.

Various methods have been suggested for remote sensing of the path-averaged crosswind. Most of them depend on temporal analysis of the reflected beam intensity fluctuations that are produced when refractive-index irregularities are drifted across the beam.

By measuring a time-lagged covariance function with spaced detectors, one can find the strength and direction of the crosswind (See R. S. Lawrence et al, in Applied Optics, Vol.11 (1972), No.2, pp. 239-243). The limitations of systems based on this technique become apparent when paths longer than 500 m are probed. For cases of strong refractive turbulence strength $C_n^2$, scintillations saturate, and the system performance becomes unpredictable. Moreover, such a system is sensitive to non-uniformities along the propagation path (e.g., turbulence strength changes, wind fluctuations).

Ting-I Wang et al, in Applied Optics, Vol.20 (1981), No.23, pp. 4073-4081, compared various methods with regard to their immunity to the saturation problem as well as to $C_n^2$ and wind fluctuations along the propagation path. Their conclusion was that a frequency technique (FT), involving counting zero-crossings of the mean of the signal or width of the autocorrelation function analysis, is superior to other techniques. Nevertheless, no technique is ideal and the FT technique has its own limitations, mainly due to turbulence spectrum changes.

L. C. Andrews et al, in J. Opt. Soc. Am, Vol.16 (1999), No.6, pp. 1417-1429 (herein "L. C. Andrews et al."), in their heuristic model of optical scintillation, showed the existence of a definite form of coupling between the turbulence strength and the turbulence spectrum. This model was developed under the assumption that the turbulence spectrum is characterized by a two-scale behavior, one (small-scale) for diffractive irradiance fluctuations and another one (large scale) for refractive irradiance fluctuations. In accordance with this model it is possible to define the upper frequency bound (for the smallest cell size) and the lower frequency bound (for the largest cell size) in strong and in weak turbulences. Thereby it is possible to apply an envelope filter for the FT technique.

SUMMARY OF THE INVENTION

The present invention seeks to provide a system and method for wind velocity calculation that is more accurate than any other prior art system. The invention is applicable over a wide range of turbulence strength changes and all wind fluctuations. The invention may be used in ballistic systems to provide automatic displacement of sight crosshairs in order to compensate for crosswind and drop of a bullet along the trajectory.

There is thus provided in accordance with an embodiment of the present invention a system for computation of wind velocity including a laser adapted to transmit a beam to a target, a collecting lens for receiving a beam returning from the target, and receiver optics including a multi-element detector array at a focal plane of the collecting lens, wherein for each element of the multi-element detector array there is a specific optical path in the atmosphere leading from the laser to the target and back from the target to the element, and processor apparatus operative to measure signal fluctuations of an element of the multi-element detector array, and compute therefrom crosswind velocity of wind in the atmosphere, wherein the processor apparatus is operative to calculate turbulence strength changes.

In accordance with an embodiment of the present invention the processor apparatus is operative to compare signal fluctuations patterns of two or more elements of the multi-element detector array, compute variances of image centroid displacements, and use the variances to determine a turbulence strength value and wind in the atmosphere.

In accordance with an embodiment of the present invention the processor apparatus is operative to choose the characteristic spatial frequency for a given turbulence strength for which the wind velocity is inversely proportional.

In accordance with an embodiment of the present invention the processor apparatus is operative to compare signal fluctuations patterns of two or more elements of the multi-element detector array, compute a cross-correlation function, and use the cross-correlation function to define a wind direction of wind in the atmosphere.

In accordance with an embodiment of the present invention an aperture $D_r$ of the collecting lens and a size $D_t$ of a beam spot of the laser on the target are increased to make the system insensitive to small diffractive cells with spatial scale smaller than Fresnel zone $(L/k)^{1/2}$ for weak turbulence, and smaller than the coherence radius $\rho_0$ for strong turbulence.

In accordance with an embodiment of the present invention a field of view of each element of the multi-element detector array is reduced to 1/n of the laser beam divergence, wherein n is the number of elements in the multi-element detector array.

In accordance with an embodiment of the present invention the beam is transmitted to a target composed of atmospheric aerosols or particles or a moving target, and wherein the processor apparatus is operative to subtract signals reflected from various distances along the beam path.

In accordance with an embodiment of the present invention the processor is operative to determine the spatial wind velocity and direction profiles.

There is also provided in accordance with an embodiment of the present invention a method for computation of wind velocity including transmitting a laser beam to a target, using a collecting lens to receive a beam returning from the target, wherein there is a multi-element detector array at a focal plane of the collecting lens, wherein for each element of the multi-element detector array there is a specific optical path in the atmosphere leading from the laser to the target and back from the target to the element, and measuring signal fluctuations of an element of the multi-element detector array, and computing therefrom crosswind velocity of wind in the atmosphere, and calculating turbulence strength changes.

In accordance with an embodiment of the present invention the method further includes comparing signal fluctuations patterns of two or more elements of the multi-element detector array, computing variances of image centroid displacements, and using the variances to determine a turbulence strength value and wind in the atmosphere.

In accordance with an embodiment of the present invention the method further includes choosing the characteristic spatial frequency for a given turbulence strength for which the wind velocity is inversely proportional.

In accordance with an embodiment of the present invention the method further includes comparing signal fluctuations patterns of two or more elements of the multi-element detector array, computing a cross-correlation function, and using the cross-correlation function to define a wind direction of wind in the atmosphere.

In accordance with an embodiment of the present invention an aperture $D_r$ of the collecting lens and a size $D_t$ of a beam spot of the laser on the target are increased to make the system insensitive to small diffractive cells with spatial scale smaller than Fresnel zone $(L/k)^{1/2}$ for weak turbulence, and smaller than the coherence radius $\rho_0$ for strong turbulence.

In accordance with an embodiment of the present invention a field of view of each element of the multi-element detector array is reduced to 1/n of the laser beam divergence, wherein n is the number of elements in the multi-element detector array.

In accordance with an embodiment of the present invention the method further includes transmitting the beam to a target composed of atmospheric aerosols or particles or a moving target, and subtracting signals reflected from various distances along the beam path.

In accordance with an embodiment of the present invention the method further includes determining the spatial wind velocity and direction profiles.

BRIEF DESCRIPTION OF THE DRAWINGS

The present invention will be understood and appreciated more fully from the following detailed description taken in conjunction with the drawing in which:

FIG. 1 is a simplified schematic illustration of a system for wind velocity calculation, constructed and operative in accordance with an embodiment of the present invention.

DETAILED DESCRIPTION OF EMBODIMENTS

Reference is now made to FIG. 1, which illustrates a system for wind velocity calculation, constructed and operative in accordance with an embodiment of the present invention.

The system may comprise a LIDAR (Light Detection And Ranging) unit 20 and a night-and-day sight unit 22, but the system of the invention is not limited to this application and may be used in any application requiring wind velocity calculation.

The LIDAR 20 may comprise an eye safe laser 1 (e.g., $\lambda=1.54$ μm), which may transmit short pulses at a 1 kHz rep-rate, and which may include transmitter optics for beam collimating (for example, with a divergence of 300 μRad) a beam which is transmitted to a target 10. (The invention is not limited to these exemplary values.) A collecting lens 2 may be provided with a wide bandpass, which is adapted to receive beams returning from the target 10. The collecting lens 2 may be correlated to the night-and-day sight unit 22 as well as to the wavelength of the laser. A dichroic beam splitter 3 with a narrow band pass (which may be adapted to the wavelength of the laser) may send the beam to the night-and-day sight unit 22 for processing.

A multi-element receiver 4 may be positioned at the focal plane of the collecting lens 2 (e.g., InGaAs PIN or APD photodiode array, with two elements in a row or more). Other components of the LIDAR unit 20 for use with the laser 1 and the multi-element receiver 4 may include, without limitation, preamplifiers 5, peak detectors 6 and power supply and electronics unit 7.

In the horizontal plane, the field of view of the receiver optics, with all of the photodiode elements together, is equal to or greater than the laser beam divergence. Therefore, for each element of the photodiode array there is a specific optical path in the atmosphere leading from the laser to a target 10 and back from the target 10 to the element. Accordingly, each element of the detector array can be regarded as if illuminated by a distinct light source. For short time periods (in the range of tens to hundreds of milliseconds) the shape or spatial distribution of the refractive-index irregularities does not significantly change (for example, according to Taylor's hypothesis, although the invention is not limited at all to this hypothesis, and the correctness of the hypothesis is immaterial to the invention), and the irregularities drift with the atmospheric wind. By measuring the signal fluctuations (e.g., counting zero-crossings of the mean of the signal) by any element of the photodiode array, it is possible to compute the crosswind velocity. By comparing signal fluctuations patterns of two or more elements it is possible to define the wind direction (by computing the cross-correlation function) and to determine the turbulence strength value (by computing the variance of the image centroid displacements—angle-of-arrival fluctuations).

The night-and-day sight unit 22 may include a processor apparatus with processing capability for carrying out the processing and calculations described in the specification. Alternatively, a separate processor apparatus may be provided for this task.

Turbulence strength changes and wind fluctuations insensitivity may be determined by the following analysis:

From two-scale turbulence spectrum we choose the irregularities (fluctuations) that act as refractive lenses with focal lengths on the order of hundreds of meters or more.

These are less sensitive to the saturation problem. According to L. C. Andrews et al., these are eddy cells with spatial scale $l_w \sim \rho_0$ for weak fluctuations range, and $l_s \sim L/k\rho_0$ for strong fluctuations range (L—path range, k—wave number, $\rho_0=(1.46C_n^2k^2L)^{-3/5}$—coherence radius for plane wave). Corresponding spatial frequencies are $k_w \sim 1/\rho_0$ for weak turbulence and $k_s \sim k\rho_0/L$ for strong turbulence.

Increasing the collecting lens aperture $D_r$ and light source size $D_t$ (laser beam spot on the target) make the system insensitive to small diffractive cells with spatial scale smaller than Fresnel zone $(L/k)^{1/2}$ for weak turbulence, and smaller than the coherence radius $\rho_0$ for strong turbulence. Diffractive cells scattering process acts as a source of a "turbulence noise" for the frequency technique crosswind measurements. The criteria for the system to remain free of diffractive cells influence are: $D_r \gg (L/k)^{1/2}$, $D_t \gg (L/k)^{1/2}$ for weak turbulence and $D_r \gg \rho_0$, and $D_t \gg \rho_0$ for strong turbulence. For example, for a path range of 800 m the criterion of the weak-strong turbulence bound (Rytov variance $\sigma_1^2 \ll 1$, where $\sigma_1^2=1.23C_n^2k^{7/6}L^{11/6}$) is $C_{n0}^2=5*10^{-14}$ $m^{-2/3}$ and the maximum value of $\rho_0$ is 1.5 cm for $C_n^2 > C_{n0}^2$ and the Fresnel zone value is 1.4 cm. A proposed collective lens aperture is $D_r=8$ cm and laser divergence 0.3 mrad. Therefore for each laser source (beam spot on the target) size $D_t=12$ cm.

The signal fluctuations frequency $f_s$ are proportional to the crosswind v and wave number k: $f_s \sim k \cdot v$. Therefore, the laser rep-rate F must be more than maximum $f_s$ for each turbulence range, that is $F_w > k_w \cdot v_{max}$ for weak turbulence. For example: L=800 m, maximum spatial frequency $k_w \sim 50$ $m^{-1}$ and for $v=10$ m/s $F_w > 500$ Hz) and
$Fs > k_s \cdot v_{max}$ for strong turbulence ($L=800$ m,
$k_s < 37$ $m^{-1}$ and for $v=10$ m/s $F_s > 370$ Hz).

A possible laser rep-rate is 1000 Hz, although the invention is not limited to this value. For SNR improving (SNR~$N_{ZC}/v$, where $N_{ZC}$—number of zero-crossings) it is possible to use a low-pass filter.

Better accuracy of the crosswind velocity and resolving capability may be achieved by reducing the field of view of each photodiode element to 1/n of the laser beam divergence (n—number of elements in an array). In this manner, n independent light sources are formed. Each of them has separate pattern scintillations according to its own path in the atmosphere from the laser to the receiver. The advantage is in doubling of the turbulence range and, accordingly, in the possibility to keep superior system performance even when a turbulence strength parameter $C_n^2$ is very low.

By using the method and the system with a target composed of atmospheric aerosol, particles or a moving target the crosswind spatial profile as well as the local wind value along the optical path to the target may be determined. This applies also to the wind direction.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A system for computation of wind velocity comprising:
a laser adapted to transmit a beam to a target, a collecting lens for receiving a beam returning from the target, and receiver optics comprising a multi-element detector array at a focal plane of the collecting lens, wherein for each element of the multi-element detector array there is a specific optical path in the atmosphere leading from the laser to the target and back from the target to the element; and
processor apparatus operative to measure signal fluctuations of an element of the multi-element detector array, and compute therefrom crosswind velocity of wind in the atmosphere, wherein said processor apparatus is operative to calculate turbulence strength changes, wherein said processor apparatus is operative to choose the characteristic spatial frequency for a given turbulence strength for which the wind velocity is inversely proportional.

2. The system according to claim 1, wherein said processor apparatus is operative to compare signal fluctuations patterns of two or more elements of the multi-element detector array, compute variances of image centroid displacements, and use said variances to determine a turbulence strength value and wind in the atmosphere.

3. The system according to claim 1, wherein said processor apparatus is operative to compare signal fluctuations patterns of two or more elements of the multi-element detector array, compute a cross-correlation function, and use said cross-correlation function to define a wind direction of wind in the atmosphere.

4. The system according to claim 1, wherein an aperture $D_r$ of said collecting lens and a size $D_t$ of a beam spot of said laser on the target are increased to make the system insensitive to small diffractive cells with spatial scale smaller than Fresnel zone $(L/k)^{1/2}$ for weak turbulence, and smaller than the coherence radius $\rho_0$ for strong turbulence.

5. The system according to claim 1, wherein a field of view of each element of the multi-element detector array is reduced to 1/n of the laser beam divergence, wherein n is the number of elements in the multi-element detector array.

6. The system according to claim 1 wherein the beam is transmitted to a target composed of atmospheric aerosols or particles or a moving target, and wherein said processor apparatus is operative to subtract signals reflected from various distances along the beam path.

7. The system according to claim 6, wherein said processor is operative to determine the spatial wind velocity and direction profiles.

8. A method for computation of wind velocity comprising:
transmitting a laser beam to a target,
using a collecting lens to receive a beam returning from the target, wherein there is a multi-element detector array at a focal plane of the collecting lens, wherein for each element of the multi-element detector array there is a specific optical path in the atmosphere leading from the laser to the target and back from the target to the element; and
measuring signal fluctuations of an element of the multi-element detector array, and computing therefrom crosswind velocity of wind in the atmosphere, and calculating turbulence strength changes, further comprising choosing the characteristic spatial frequency for a given turbulence strength for which the wind velocity is inversely proportional.

9. The method according to claim 8, further comprising comparing signal fluctuations patterns of two or more elements of the multi-element detector array, computing variances of image centroid displacements, and using said variances to determine a turbulence strength value and wind in the atmosphere.

10. The method according to claim 8, further comprising comparing signal fluctuations patterns of two or more elements of the multi-element detector array, computing a cross-correlation function, and using said cross-correlation function to define a wind direction of wind in the atmosphere.

11. The method according to claim 8, wherein an aperture $D_r$ of said collecting lens and a size $D_t$ of a beam spot of said laser on the target are increased to make the system insensitive to small diffractive cells with spatial scale smaller than Fresnel zone $(L/k)^{1/2}$ for weak turbulence, and smaller than the coherence radius $\rho_0$ for strong turbulence.

12. The method according to claim 8, wherein a field of view of each element of the multi-element detector array is reduced to 1/n of the laser beam divergence, wherein n is the number of elements in the multi-element detector array.

13. The method according to claim 8, further comprising transmitting the beam to a target composed of atmospheric aerosols or particles or a moving target, and subtracting signals reflected from various distances along the beam path.

14. The method according to claim 13, further comprising determining the spatial wind velocity and direction profiles.

* * * * *